(12) United States Patent
Fu et al.

(10) Patent No.: US 11,638,180 B2
(45) Date of Patent: Apr. 25, 2023

(54) METHODS, WIRELESS DEVICE AND NODES FOR MANAGING RESERVATION OF BANDWIDTH

(71) Applicant: Telefonaktiebolaget LM Ericsson (publ), Stockholm (SE)

(72) Inventors: Jing Fu, Solna (SE); Rafia Inam, Västerås (SE); Vlasios Tsiatsis, Solna (SE); Aneta Vulgarakis Feljan, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1102 days.

(21) Appl. No.: 16/324,953

(22) PCT Filed: Aug. 16, 2016

(86) PCT No.: PCT/EP2016/069432
§ 371 (c)(1),
(2) Date: Feb. 12, 2019

(87) PCT Pub. No.: WO2018/033198
PCT Pub. Date: Feb. 22, 2018

(65) Prior Publication Data
US 2019/0174361 A1 Jun. 6, 2019

(51) Int. Cl.
*H04W 28/26* (2009.01)
*H04L 5/00* (2006.01)
(Continued)

(52) U.S. Cl.
CPC ............ *H04W 28/26* (2013.01); *G01C 21/34* (2013.01); *G08G 1/09* (2013.01); *G08G 1/0968* (2013.01);
(Continued)

(58) Field of Classification Search
CPC . H04W 28/26; H04W 4/029; H04W 72/0453; H04W 72/0493; H04W 72/14;
(Continued)

(56) References Cited

U.S. PATENT DOCUMENTS

| 6,188,905 B1 | 2/2001 | Rudrapatna et al. |
| 2004/0029553 A1* | 2/2004 | Cain ....................... H04L 45/02 455/445 |

(Continued)

FOREIGN PATENT DOCUMENTS

EP 0973352 A2 1/2000

*Primary Examiner* — Omar J Ghowrwal
(74) *Attorney, Agent, or Firm* — Murphy, Bilak & Homilier, PLLC (57) ABSTRACT

Methods, a wireless device (110), a radio network node (120) and a core network node (130) for reservation of bandwidth are disclosed. The wireless device (110) sends (A010), to the core network node (130), an inquiry for reservation of bandwidth. The inquiry comprises information about a route to be travelled by the wireless device (110), a start time, and an indication about the bandwidth to be reserved. The core network node (130) sends (A040), to the radio network node (120), a command for reservation of the bandwidth to be reserved for the wireless device (110). The command comprises the indication, information relating to one or more cells of the radio network node (120), in which one or more cells bandwidth is to be reserved according to the indication, a parameter indicating a period of time during which the wireless device (110) is expected to make use of at least some of the bandwidth to be reserved, and an identity of the wireless device (110). The radio network node (120) determines (A060) grant or denial of the command based on the period of time and based on available bandwidth of the radio network node (120). Corresponding computer programs and computer program carriers are also disclosed.

17 Claims, 5 Drawing Sheets

(51) Int. Cl.
  *H04W 4/029*    (2018.01)
  *H04W 72/04*    (2009.01)
  *H04W 72/14*    (2009.01)
  *G08G 1/0968*   (2006.01)
  *H04W 4/02*     (2018.01)
  *G01C 21/34*    (2006.01)
  *G08G 1/09*     (2006.01)
  *H04W 72/0453*  (2023.01)
  *H04W 4/70*     (2018.01)
  *H04W 36/32*    (2009.01)

(52) U.S. Cl.
  CPC .............. *H04L 5/0053* (2013.01); *H04W 4/02* (2013.01); *H04W 4/029* (2018.02); *H04W 72/0453* (2013.01); *H04W 72/0493* (2013.01); *H04W 72/14* (2013.01); *H04W 4/70* (2018.02); *H04W 36/32* (2013.01)

(58) Field of Classification Search
  CPC ......... H04W 4/70; H04W 36/32; H04W 4/02; H04L 5/0053; G08G 1/0968; G08G 1/09; G01C 21/34; G05B 2219/310003
  See application file for complete search history.

(56) References Cited

U.S. PATENT DOCUMENTS

2014/0315564 A1* 10/2014 Conway ................ H04W 4/029
                                                              455/452.1
2018/0234888 A1*  8/2018 Yasukawa ............... H04W 4/40

* cited by examiner

METHODS, WIRELESS DEVICE AND NODES FOR MANAGING RESERVATION OF BANDWIDTH

TECHNICAL FIELD

Embodiments herein relate to wireless communication networks, such as cellular networks, telecommunication networks or the like. In particular, a method and a wireless device for providing an inquiry for reservation of bandwidth in a network, a method and a radio network node for managing a command for reservation of bandwidth in a network as well as a method and a core network node for managing an inquiry for reservation of bandwidth in a network are disclosed. Corresponding computer programs and computer program carriers are also disclosed.

BACKGROUND

In telecommunication networks, there are usually many users, and thus also wireless devices, involved. Resources, such as bandwidth, data rate, computing capacity and more, are shared among the users. In order to guarantee a certain so called service quality, or Quality of Service (QoS), for a particular user, i.e. a particular wireless device, there have accordingly been developed techniques for reservation of bandwidth for that particular user. These techniques as often referred to as bandwidth reservation techniques.

A known bandwidth reservation technique is referred to as Resource Reservation Protocol (RSVP). RSVP operates over an Internet Protocol version 4 (IPv4) or IP version 6 (IPv6) Internet Layer and reservation is in generally done on routers of a fixed network. With RSVP, resources across a network are reserved on demand as need of resources arise. Disadvantageously, reservation of bandwidth may fail if there are no available resources when the demand arises.

Moreover, a so called semi-persistent scheduling, which may be considered to be another bandwidth reservation technique, is known from Long Term Evolution (LTE) networks, in particular from Voice over LTE (VoLTE). At handover, the semi-persistent scheduling needs to be re-established, which may result in that sufficient bandwidth cannot be reserved if a target base station, to which a cellular phone is handed over, does not have enough available resources. A disadvantage is hence that the cellular phone may lose connection to the network when there are not enough resources available.

SUMMARY

An object may be how to improve reservation of bandwidth in a network of the above mentioned kinds, while overcoming the aforementioned disadvantages.

According to an aspect, the object is achieved by a method, performed by a wireless device, for providing an inquiry for reservation of bandwidth in a network, comprising a core network node for managing inquiries for reservation of bandwidth. The wireless device sends, to the core network node, the inquiry for reservation of bandwidth for the wireless device. The inquiry comprises information about a route to be travelled by the wireless device, a start time of when the wireless device is expected to start travelling the route, and an indication about the bandwidth to be reserved.

According to another aspect, the object is achieved by a wireless device configured for providing an inquiry for reservation of bandwidth in a network, comprising a core network node for managing inquiries for reservation of bandwidth. The wireless device is configured for sending, to the core network node, the inquiry for reservation of bandwidth for the wireless device. The inquiry comprises information about a route to be travelled by the wireless device, a start time of when the wireless device is expected to start travelling the route, and an indication about the bandwidth to be reserved.

According to a further aspect, the object is achieved by a method, performed by a radio network node, for managing a command for reservation of bandwidth in a network. The network comprises the radio network node and a core network node for managing inquiries for reservation of bandwidth. The radio network node receives, from the core network node, the command for reservation of the bandwidth for a wireless device. The command comprises an indication about the bandwidth to be reserved, information relating to one or more cells of the radio network node, in which one or more cells bandwidth is to be reserved, a period of time indicating when the wireless device is expected to make use of at least some of the bandwidth to be reserved, and an identity of the wireless device. Moreover, the radio network node determines grant or denial of the command based on the period of time and based on available bandwidth of the radio network node.

According to yet another aspect, the object is achieved by a radio network node configured for managing a command for reservation of bandwidth in a network. The network comprises the radio network node and a core network node for managing inquiries for reservation of bandwidth. The radio network node is configured for receiving, from the core network node, a command for reservation of the bandwidth for a wireless device. The command comprises an indication about the bandwidth to be reserved, information relating to one or more cells of the radio network node, in which one or more cells bandwidth is to be reserved, a period of time indicating when the wireless device is expected to make use of at least some of the bandwidth to be reserved, and an identity of the wireless device. Moreover, the radio network node is configured for determining grant or denial of the command based on the period of time and based on available bandwidth of the radio network node.

According to a still further aspect, the object is achieved by a method, performed by a core network node, for managing an inquiry for reservation of bandwidth in a network, comprising a plurality of radio network nodes. The core network node receives, from a wireless device, the inquiry for reservation of the bandwidth for the wireless device. The inquiry comprises information about a route to be travelled by the wireless device, a start time of when the wireless device is expected to start travelling the route, and an indication about the bandwidth to be reserved. Furthermore, the core network node sends, to each radio network node along the route, a command for reservation of the bandwidth to be reserved for the wireless device. The command comprises an indication about the bandwidth to be reserved, information relating to one or more cells of the radio network node, in which one or more cells bandwidth is to be reserved, a parameter indicating a period of time during which the wireless device is expected to make use of at least some of the bandwidth to be reserved, and an identity of the wireless device.

According to a yet further aspect, the object is achieved by a core network node configured for managing an inquiry for reservation of bandwidth in a network, comprising a plurality of radio network nodes. The core network node is configured for receiving, from a wireless device, the inquiry for reservation of the bandwidth for the wireless device. The inquiry comprises information about a route to be travelled by the wireless device, a start time of when the wireless device is expected to start travelling the route, and an indication about the bandwidth to be reserved. Furthermore, the core network node is configured for sending, to each radio network node along the route, a command for reservation of the bandwidth to be reserved for the wireless device. The command comprises an indication about the bandwidth to be reserved, information relating to one or more cells of the radio network node, in which one or more cells bandwidth is to be reserved, a parameter indicating a period of time during which the wireless device is expected to make use of at least some of the bandwidth to be reserved, and an identity of the wireless device.

According to further aspects, the object is achieved by computer programs and computer program carriers corresponding to the aspects above.

Thanks to that the inquiry comprises information about the route to be travelled by the wireless device, the network—such as the core network node and/or the radio network node—may be made aware of where, i.e. in which radio cells or in which vicinities of radio network nodes, to reserve bandwidth in advance of when a need for bandwidth for use by the wireless device occurs. Such need may not be detected until the wireless device is served by, or located in, a radio range of any radio network node along the route. Radio range may refer to "within coverage" according to common terminology within telecommunications systems.

Additionally, thanks to that the inquiry comprises the start time of when the wireless device is expected to start travelling the route, the network may be made aware of when to reserve bandwidth in advance of when the need for bandwidth may be detected. As an example, the information about the route, the start time and an estimate of speed of the wireless device may be used to estimate when a certain radio network node along the route may need to reserve bandwidth.

Furthermore, the indication about the bandwidth may be used by the network to determine an amount of bandwidth to be reserved, e.g. reserve 0.5 Mbit/s for the wireless device.

In this manner, a prediction of when bandwidth may need to be reserved is achieved. Therefore, reservation of bandwidth may be made in advance of, or even well in advance of, when the resources are actually demanded.

An advantage is, hence, that service quality may be ensured since degradation of service quality is expected to be reduced thanks to reservation of bandwidth as described herein.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

In order to better appreciate, the embodiments described herein, the following observations are presented.

It is widely known that a cellular network does not provide equal connectivity, such as signal and/or radio coverage, bandwidth, etc., in all geographical areas. During a trip, it is common that travelers, such as persons or autonomous vehicles, with a given destination would like to have an access to the cellular network with a certain guarantee on the network bandwidth, often referred to as QoS, through the entire trip. The bandwidth may be used to stream a video, make a phone call, play an online game, or exchange Vehicle-to-Infrastructure (V2I) data for the sake of autonomous driving or the like. In this scenario, known bandwidth reservation techniques such as the ones presented in the background section may not be sufficiently efficient. In particular, a bandwidth reservation technique that is able to reserve bandwidth across multiple so called cells, or radio cells, is needed.

Moreover, Internet Protocol (IP)-based or radio-based bandwidth reservation techniques typically perform on-demand reservation. That is to say, the reservation request is issued to the network when the demand occurs, or shortly after. A reason for this is that a cellular phone, or User Equipment (UE), cannot predict a need for bandwidth a long time in the future so as to request resource reservation well in advance. These kind of reservation techniques performs reservation on a per single base station basis or for fixed wireline network connections. However, autonomous vehicles or taxis or private vehicles having a fixed origin-destination locations, describing a route, may benefit from a different way of reserving bandwidth. In fact, any wireless device that is aware of its future route, or expected future route, may benefit from taking advantage of its knowledge about the route as described herein.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

Figure 1:
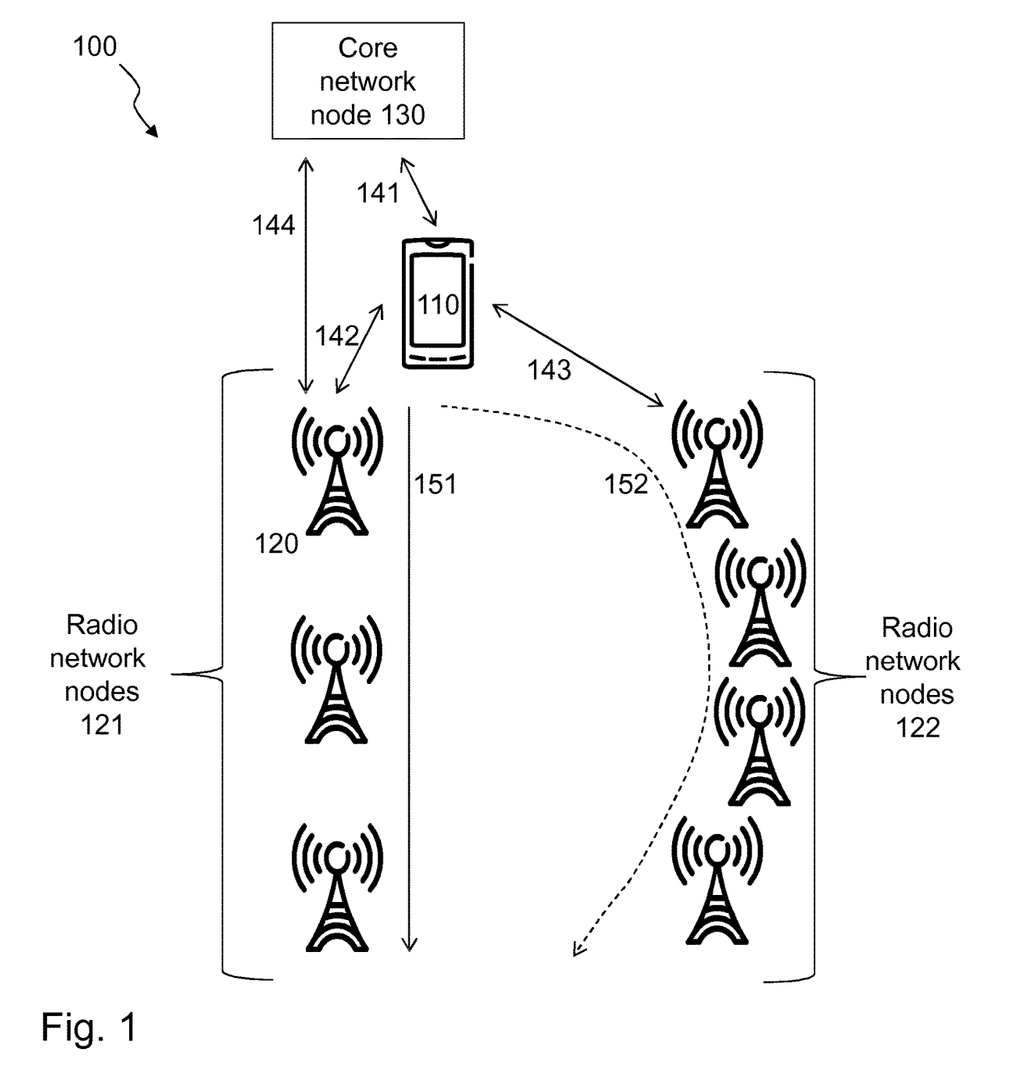
FIG. 1 is a schematic overview of an exemplifying network in which embodiments herein may be implemented.

FIG. 1 depicts an exemplifying network 100, such as a telecommunications network, in which embodiments herein may be implemented. In this example, the network 100 is an LTE network.

In other examples, the network 100 may be any cellular or wireless communication system, such as a Global System for Mobile communication (GSM), Universal Mobile Telecommunication System (UMTS) and Worldwide Interoperability for Microwave Access (WiMAX) allowing a layer of D2D communications or the like. The network 100 may for example be a network such as LTE Frequency Division Duplex (FDD), LTE Time Division Duplex (TDD), LTE Half-Duplex Frequency Division Duplex (HD-FDD), LTE operating in an unlicensed band, or a Wideband Code Division Multiple Access (WCDMA), Universal Terrestrial Radio Access (UTRA) TDD, Ultra-Mobile Broadband (UMB), GSM/Enhanced Data Rate for GSM Evolution (EDGE) Radio Access Network (GERAN) network, EDGE network, a network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, 5G system or any cellular network or system.

The network 100 may be said to comprise a wireless communication device 110. This means that the wireless communication device 110 is present in the network 100.

As used herein, the term "wireless device" may refer to a user equipment (UE), a wireless communication device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor device may sense any kind of weather metric, such as wind, temperature, air pressure, humidity etc. As further examples, the sensor device may be a light sensor, an electronic or electric switch, a microphone, a loudspeaker, a camera sensor etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

Furthermore, a radio network node 120 is shown in FIG. 1. The network 100 may comprise the radio network node 120. In some examples, the wireless device 110 requests access to the radio network node 120. The radio network node 120 may operate one or more cells (not shown), in which the wireless communication devices 110 may be located. The cells may represent areas where the radio network node 120 may serve the wireless device 110.

Generally, the network 100 may comprise a plurality of radio network nodes, including radio network nodes 121 and further radio network nodes 122, among which the radio network node 120 is found.

As used herein, the term "radio network node" may refer to a Base Station System (BSS), a Radio Network Controller (RNC), a Radio Base Station (RBS), an evolved Node B (eNB), a control node controlling one or more Remote Radio Units (RRUs), an access point or the like.

Moreover, the network 100 comprises a core network node 130, such as an Mobility Management Entity (MME) or the like.

The core network node 130 may communicate 141 with the wireless device 110. This communication, which typically passes via the radio network node 120, may include user transmissions and/or control transmissions. The user transmissions may include user data, payload data, content data etc. The control transmissions may include control information relating to e.g. scheduling, authentication, mobility, power control etc. The communication may include uplink transmission and/or downlink transmission.

The radio network node 120 may communicate 142 with the wireless communication device 110. This communication may include user transmissions and/or control transmissions. The user transmissions may include user data, payload data, content data etc. The control transmissions may include control information relating to e.g. scheduling, authentication, mobility, power control etc. The communication may include uplink transmission and/or downlink transmission.

A further radio network node may communicate 143 with the wireless communication device 110. This communication may include user transmissions and/or control transmissions. The user transmissions may include user data, payload data, content data etc. The control transmissions may include control information relating to e.g. scheduling, authentication, mobility, power control etc. The communication may include uplink transmission and/or downlink transmission.

The core network node 130 may communicate 144 with the radio network node 120. This communication may include user transmissions and/or control transmissions. The user transmissions may include user data, payload data, content data etc. The control transmissions may include control information relating to e.g. scheduling, authentication, mobility, power control etc. The communication may include uplink transmission and/or downlink transmission.

The wireless device 110 may be expected to travel along a route 151 while passing, e.g. being served by, the radio network nodes 121. As an example, the wireless device 110 may be aware of that it is expected to travel along the route 151 since a user of the wireless device 110 has input a destination and requested travel directions thereto. Moreover, the wireless device 110 and/or further wireless devices (not shown) may be located on a bus or a taxi, whose departure location and arrival location are known to the wireless device 110. The departure and arrival locations may be known, because e.g. a user of the wireless device 110 may have ordered a ticket for the bus by means of an app in the wireless device 110. A further route 152 to the destination may expect the wireless device 110 to travel along the further radio network nodes 122. A purpose and a use of the further route will be explained below.

Figure 2:
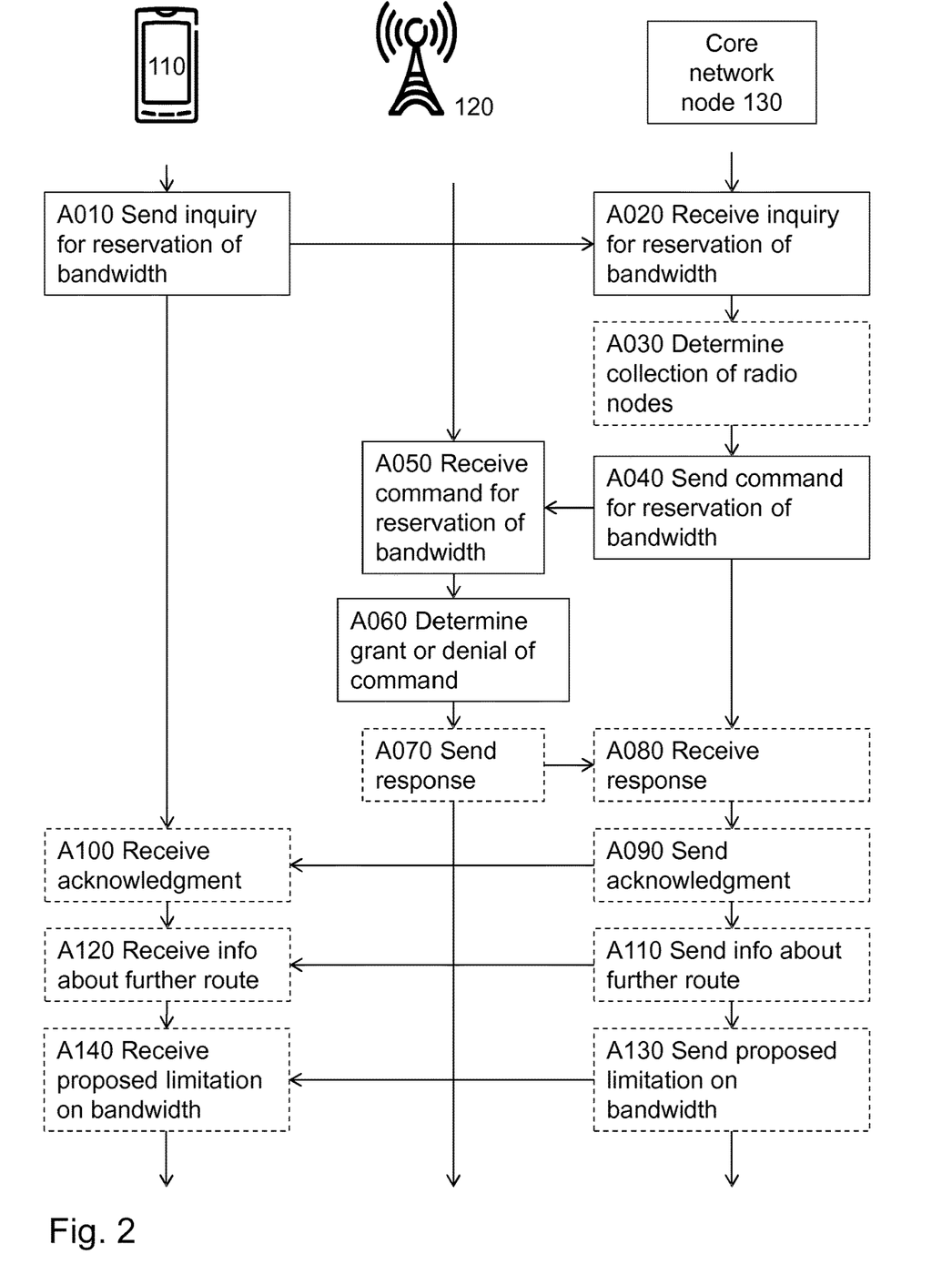
FIG. 2 is a combined signaling and flowchart illustrating the methods herein.

FIG. 2 illustrates an exemplifying method according to embodiments herein when implemented in the network 100 of FIG. 1. The network 100 may include a Connectivity Management System (CMS) for a fleet of Internet-Of-Things (IoT) devices, such as the wireless device 110 or the like.

The wireless device 110 performs a method for providing an inquiry for reservation of bandwidth in the network 100. The radio network node 120 performs a method for managing a command for reservation of bandwidth in the network 100. The core network node 130 performs a method for managing an inquiry for reservation of bandwidth in the network 100.

As mentioned, the network 100 comprises the radio network node 120 and the core network node 130 for managing inquiries for reservation of bandwidth. The network 100 comprises a plurality of radio network nodes 121, 122.

As an initial action, the wireless device 110 may detect, such as know or predict, that the wireless device 110 is expected to travel along the route 151. Accordingly, the wireless device 110 is made aware of the route 151 in any suitable manner, such as by means of user input or an application for managing driving directions.

One or more of the following actions may be performed in any suitable order.

Action A010

When the wireless device 110 has knowledge about the route 151, the wireless device 110 sends an inquiry for reservation of bandwidth for the wireless device 110. The inquiry is sent to the core network node 130. The inquiry comprises information about the route to be travelled by the wireless device 110, a start time of when the wireless device 110 is expected to start travelling the route, and an indication about the bandwidth to be reserved. The inquiry may further comprise an indicator relating to expected speed of the wireless device when travelling along the route and/or a stop time of when the wireless device is expected to have reached the destination given by an end of the route. The inquiry may also comprise an identity relating to the wireless device 110.

The information about the route may comprise a set of directions, such as driving directions, a set of Global Positioning System (GPS) coordinates, a set of identities of radio network nodes, a bus-line description, origin and destination location for a train, a origin location and an destination location or the like. Alternatively or additionally, the information about the route may be input by the user, or may be provided by an application, typically referred to as "app", executing in the wireless device.

The driving directions may relate not only to driving of a vehicle, but also to cycling and/or walking and/or travelling by train and/or bus or the like.

The set of identities of radio network nodes may be Base station identity (ID), Global Cell ID or the like.

The start time, e.g. given as a date and a time, may be calculated based on a calendar event stored in the wireless device. As an example, the calendar event may specify a meeting time at a certain location. The wireless device 110 may then expect, depending on its current location, a certain route to be travelled some time in advance of the event. Moreover, the start time may be calculated based on information about time tables for busses, trains, flights etc. The start time and the route may also be predicted from some historical wireless device behavior. As an example, the start time may be estimated based on start time(s) of a previous vehicle(s) of a similar type(s) in similar congestion situations, similar time of the day and the like.

The indication about the bandwidth to be reserved may be given as a bitrate, such as the number of Mbit/s or a number indicating the bandwidth requirement within a quantization scale e.g. from 1 to 10, 1 indicating 64 kbit/s, 10 indicating 20 Mbit/s purely as examples. Moreover, the indication may be given as a list of bitrates for different parts of the route, where different parts of the route may or may not require different reservations of bandwidth. An inquiry with a list of indications may be considered as an alternative to sending a plurality of inquiries where each of such plurality of inquires relates to a respective portion of a common route.

The indicator relating to speed may include actual velocities, two or more quantized values representing the actual velocities or similar. As an example, the indicator may be 1, which would represent low velocity, e.g. below 15 km/h. In this example, a high velocity would be represented by a value of 2 when the speed is above 15 km/h. Any other quantization may of course be applied as appropriate. As another example, the indicator may be 20, which then would represent the actual velocity of 20 km/h. In this example, the values directly represent the actual velocity in any appropriate unit for measuring speed.

In the following table, a number of inquiries, namely inquiry A through D, are given purely as exemplifying inquiries about bandwidth.

| Inquiry | Information about route (GPS coordinates or cell identity) | Start time | Indication about the bandwidth (Mbit/s) | Device speed (optional) |
|---|---|---|---|---|
| Inquiry A | [60.2, 25.0], [62.0, 25.0] | 10.00 a.m. | 2 | 1 |
| Inquiry B | [60.2, 25.0], [60.2, 24.0], [62.0, 22.0], [63.0, 22.0], . . . [66.0, 21.0] | 12.00 a.m. | 0.5 | 1 |
| Inquiry C | C11326, C11521 | 02.00 p.m. | 1 | 2 |
| Inquiry D | C11326, C11328, C11329, C11521 | 03.00 p.m. | 3 | 2 |

Notice that the coordinates in the table above are fictitious.

The device speed may be given as a type of the device, such as car, pedestrian, bike or the like, where each type of device is associated with a default speed. The default speed may be a typical speed for that type of device, where e.g. 6 km/h may be typical for a pedestrian, 20 km/h may be typical for a bike or other values as deemed appropriate.

Action A020

Subsequent to action A010, the core network node 130 receives, from the wireless device 110, the inquiry, which has been described in detail above.

Action A030

Upon receiving the inquiry, the core network node 130 may determine a collection of radio network nodes 121, aka radio network nodes 121, from among the plurality of radio network nodes 121, 122 based on the information about the route. The wireless device 110 is expected to be served by the collection of radio network nodes 121 when travelling along the route.

When the information about the route comprises the set of identities of radio network nodes, this action amounts to using the set of identities to identify to which radio network nodes 121 the command(s) is to be sent in action A040 below.

However, in many cases, the core network node 130 may determine the collection of radio network nodes 121 based on the information about the route and information about network layout. As an example, this means that the core network node determines the collection of radio network nodes based on GPS coordinates in combination with information about network layout, which enables identification of a radio network node based on the GPS coordinates. The information about network layout thus comprises information about which radio network node, identified by an identity of radio network nodes, such as Cell ID, is likely to serve some wireless device located at a particular GPS coordinate. Hence, also in these cases, each radio network node of the collection may be identified by a respective identity of the set of identities of radio network nodes.

The core network node 130 may therefore, for each received inquiry, associate a respective start time for each radio network node of the collection, where said each radio network node may be identified by a respective identity of the set of identities.

In the following table, the collection of radio network nodes have been determined and each radio network node is identified by its Cell IDs for which a respective associated start time is specified. In cases, as mentioned above, there are different bandwidth requirements for different parts of the route, this table may also include information about the bandwidth to be reserved for each of the radio network nodes of the collection of radio network nodes.

| Inquiry A | Start time | Cell ID | GPS coordinate (optional) | Bandwidth to be reserved (optional) |
|---|---|---|---|---|
| Inquiry A.1 | 10.00 a.m. | C11326 | [60.2, 25.0] | 1 |
| Inquiry A.2 | 10.10 a.m. | C11328 | [60.3, 25.0] | 1.5 |
| Inquiry A.3 | 10.15 a.m. | C11521 | [60.35, 25.0] | 2 |
| Inquiry A.4 | 10.20 a.m. | C11528 | [60.4, 25.0] | 1 |

In some examples, the core network node 130 may determine one or more additional collections of radio network nodes 122, aka further radio network nodes 122, from among the plurality of radio network nodes based on the information about the route. In these examples, the information about the route typically comprises an origin location and a destination location.

The determining of the collection of radio network nodes and/or the additional collections of radio network nodes, and possibly any associated route(s), may further be based on information about maps, traffic conditions, whether conditions and the like. As an example, the associated route may be the further route 152. A reason for providing the further route 152 may be that bandwidth may not be possible to reserve for the route 151. Then, the further route 152 may be recommended to the wireless device 110 instead. The route and the collection and/or the additional collections of radio network nodes may thus also depend on other parameters, such as road conditions, current traffic situation and weather conditions and the like.

In this action, the core network node 130 may also take into account indications about available bandwidth when determining the collection of radio network nodes and/or the additional collections of radio network nodes, and possibly any associated route(s). The indications may be received (not shown) from the plurality of radio network nodes at regular or irregular time intervals. In this manner, at least some of the plurality of radio network nodes reports its estimated available bandwidth for upcoming time durations.

Action A040

Now that the core network node 130 is aware of the collection of radio network nodes, which the wireless device 110 is expected to be served by when travelling along the route 151, the core network node 130 sends, to each radio network node 121 along the route, a command for reservation of the bandwidth to be reserved for the wireless device 110. In more detail, the core network node 130 sends a respective command to each of the radio network nodes 121.

The command comprises the indication about the bandwidth to be reserved, information relating to one or more cells of the radio network node 120, in which bandwidth is to be reserved, a parameter indicating a period of time, i.e. typically a period of time in the future, during which the wireless device 110 is expected to make use of at least some of the bandwidth to be reserved, and an identity of the wireless device 110.

The indication about the bandwidth to be reserved may be said to indicate an amount of bandwidth to be reserved, e.g. 0.5 Mbit/s or other suitable value. Further, an example a list of indications may be provided, where each indication may be associated with a respective time stamp, such as 10:00-10:30-2 Mbit/s, 10:30-11:00, 1 Mbit/s etc.

The information relating to said one or more cells of the radio network node 120 identifies to the radio network node 120 which of its cells that are expected to serve the wireless device 110 while travelling along the route 151. Bandwidth, i.e. resources for providing the bandwidth to the wireless device 110, is thus to be reserved for said one or more cells. The resources of the radio network node 120 may be transport blocks, processing capacity, memory capacity, radio channels, bitrate or the like.

The parameter indicating the period of time during which the wireless device 110 is expected to make use of at least some of the bandwidth to be reserved may be a time and date, such as 10:00-10.30 on 20.10.2020.

The identity of the wireless device 110 may be an International Mobile Subscriber Identity (IMSI), an International Mobile Equipment Identity (IMEI), a vehicle identity number or the like.

According to the above, the indication about the bandwidth of the command is identical to the indication about the bandwidth of the inquiry. However, in some examples, the indication about the bandwidth of the command may be a measure of the bandwidth to be reserved, wherein the measure of the bandwidth may be derived from, or related to, the indication about the bandwidth. For example, when quantization is used for indicating the bandwidth to be reserved, different quantization resolutions may be different for the measure about the bandwidth and for the indication about the bandwidth of the inquiry. Quantization resolution may refer to number of bits used for quantization, or ranges used for quantization.

Action A050

Subsequent to action A040, the radio network node 120 receives, from the core network node 130, the command for reservation of the bandwidth for the wireless device 110.

Action A060

Subsequent to action A050, the radio network node 120 determines grant or denial of the command based on the period of time indicated by the parameter and based on available bandwidth of the radio network node 120.

The period of time may be defined as a start timestamp and a time duration or as a start timestamp and a stop timestamp. A timestamp may comprise date information, such as "Jul. 8, 2020", to indicate timestamps anytime in the future.

The grant may further indicate a further period of time during which the reservation of the bandwidth is expected to be fulfilled. As an example, it may be that the required bandwidth is available for a time period other than an indicated time period. E.g. the indicated time period is from 10:00 till 10:15, but the bandwidth is available from 10:04 to 10:19. The grant thus indicates 1004-1019 instead of the expected 1000-1015. In this manner, the radio network node can negotiate with the core network node and reserve the bandwidth for any time period on which user agrees. As an example, the radio network node 120 may send information to the core network node about an alternative bandwidth or an alternative time period for which the radio network node 120 can reserve bandwidth. Then, the core network node may, based on this information and/or other parameters, decide on which route to take and also negotiate, with the wireless device 110, the bandwidth to be reserved.

The term "available bandwidth" indicates a bandwidth that is expected to be unoccupied, i.e. available, such that the wireless device 110 may use the bandwidth during the period of time indicated by the parameter.

In order to determine the available bandwidth, the radio network node 120 may interact with multiple data sources that affect the load, i.e. available bandwidth, of the radio network node 120. Some exemplifying data sources are online traffic situation (more traffic means more load on the cell), weather conditions (when ice on road the traffic will move slowly and as a result the radio network node 120 may be congested for longer duration), other passengers on the route, such as passengers in a bus, i.e. number of issued tickets.

For example, the radio network node 120 may send its average load, i.e. consumed or occupied bandwidth, every 15 minutes to the core network node 130. The radio network node 120 may also predict future available bandwidth by using a particular model which takes into account any reservations of bandwidth as suggested herein. A simple model may be based on a weighted average of current and recent bandwidth. While it may also be a more advanced model which analyzes a seasonality trend, time variation of the available bandwidth, for example using an Auto-Regressive Integrated Moving Average (ARIMA) model. In particular, advanced machine learning models may be used to predict future and current available bandwidth.

Action A070

The radio network node 120 may send a response indicating the grant or the denial of the command.

In some examples as explained in last section of action A060, the response may indicate a time period other than the time period indicated by the parameter of the command received in action A050.

Action A080

Subsequent to action A070, the core network node 130 may receive the response. In this manner, the core network node 130 is made aware of an outcome of action A040, i.e. the sending of the command.

Action A090

The core network node 130 may send, to the wireless device 110, an acknowledgment indicating that the reservation of the bandwidth according to the inquiry has been accepted for a time period by at least some of the plurality of radio network nodes 121 along the route.

The acknowledgement may comprise the time period in an implicit manner, i.e. when the command has been granted as with the time period according to the parameter, the acknowledgment need not indicate any time period. However, when the command has been granted as with a response that indicates a time period that is different from the time period according to the parameter, it may be preferred that the acknowledgment explicitly comprises the time period indicated by the response.

Action A100

Subsequent to action A090, the wireless device 110 may receive, from the core network node 130, an acknowledgment indicating that the reservation of bandwidth according to the inquiry has been accepted for a time period by at least some radio network nodes 121 along the route.

Action A110

In some examples, e.g. when the command has been denied by the radio network node 120, the core network node 130 may typically refrain from performing action A090. The core network node 130 may then determine the further route 152, for which it may be that the bandwidth according to the inquiry is possible to reserve. Expressed differently, the further route 152 may allow the bandwidth according to the inquiry to be completely or partially reserved by the radio network nodes 122 along the further route 152.

Therefore, the core network node 130 may send, to the wireless device 110, information about the further route 152 for travelling to a destination given by the route. The route and the further route are at least partially different from each other, which may mean that different collections of radio network nodes 121, 122 may be passed when travelling along the route 151 and the further route 152, respectively.

In some cases, the information about the further route 152 may be comprised in the acknowledgment. Accordingly, in these cases, action A090 may be performed after action A110 with or without information about the time period as explained above.

Action A120

Subsequent to action A110, the wireless device 110 may receive, from the core network node 130, information about the further route 152 for travelling to the destination given by the information about the route 151. The route 151 and the further route 152 are at least partially different from each other.

The wireless device 110 may further confirm to the core network node 130 that the further route 152 is to be used. In more detail, the wireless device 110 may thus send a confirmation message to the core network node 130, wherein the confirmation message instructs the core network node 130 to reserve bandwidth along the further route 152, e.g. by performing action A040 with reference to the further route 152. In this manner, it is intended to make sure that the wireless device 110 may travel along the further route 152 while being guaranteed that sufficient bandwidth for the wireless device 110 will be reserved for it to use.

Action A130

In some examples, e.g. when the command has been denied by the radio network node 120, the core network node 130 may typically refrain from performing action A090. The core network node 130 may then determine a proposed limitation on bandwidth which is possible to reserve.

Then, the core network node 130 may send, to the wireless device 110, the proposed limitation on bandwidth. The proposed limitation is to be applied during travelling of the route 151.

In some cases, the proposed limitation on bandwidth may be comprised in the acknowledgment. Accordingly, in these cases, action A090 may be performed after action A110 with or without information about the time period as explained above.

Action A140

Subsequent to action A130, the wireless device 110 may receive, from the core network node 130, the proposed limitation on bandwidth. The wireless device 110 may then indicate, e.g. by means of a message on a display of the wireless device 110, to a user of the wireless device 110 that it is possible to reserve bandwidth according to the proposed limitation on bandwidth, e.g. 0.5 Mbit/s in case the inquiry originally indicated 0.7 Mbit/s.

A benefit of at least some embodiments herein is that bandwidth may be reserved for moving wireless devices, in particular if their future route is known or may be predicted. With reservation of bandwidth as proposed herein, service quality may be guaranteed for services like VoLTE, video conferencing, video on demand, car gaming, etc.

Knowledge, at the network, such as the core network node 130, of the inquiry enables the network to achieve bandwidth reservation well in advance of a demand for bandwidth. The inquiry may indicate a UE mobility patterns, including e.g. one or more of location, speed, acceleration, future route, etc. This ensures that a bandwidth reservation technique according to embodiments herein have more time to search for a solution than with solutions according to prior art.

Figure 3:
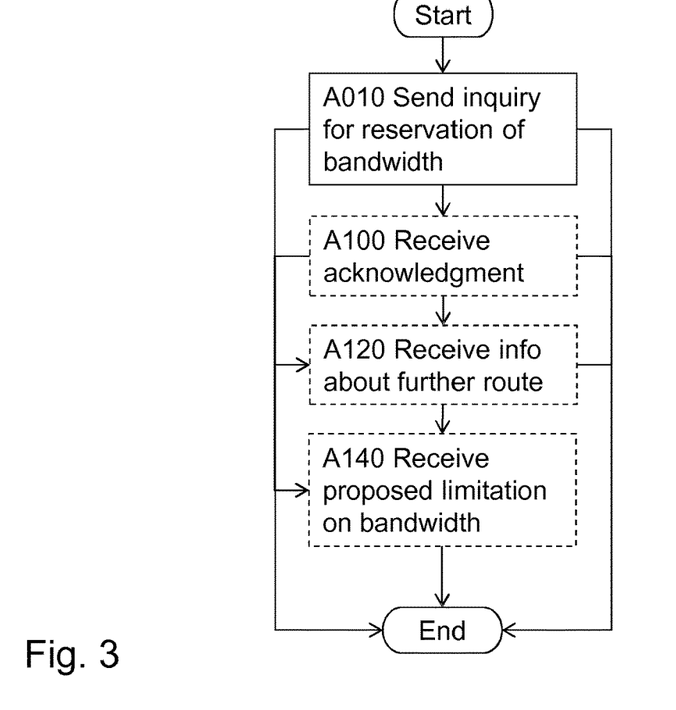
FIG. 3 is a flowchart illustrating embodiments of the method in the wireless device.

In FIG. 3, a schematic flowchart of exemplifying methods in the wireless device 110 is shown. Again, the same reference numerals as above have been used to denote the same or similar features, in particular the same reference numerals have been used to denote the same or similar actions. Accordingly, the wireless device 110 performs a method for providing an inquiry for reservation of bandwidth in a network 100, comprising a core network node 130 for managing inquiries for reservation of bandwidth.

As mentioned, the network 100 may comprise a plurality of radio network nodes 121, 122.

One or more of the following actions may be performed in any suitable order.

Action A010

The wireless device 110 sends, to the core network node 130, the inquiry for reservation of bandwidth for the wireless device 110. The inquiry comprises information about a route to be travelled by the wireless device 110, a start time of when the wireless device 110 is expected to start travelling the route, and an indication about the bandwidth to be reserved.

Action A100

The wireless device 110 may receive, from the core network node 130, an acknowledgment indicating that the reservation of bandwidth according to the inquiry has been accepted for a time period by at least some of the plurality of radio network nodes along the route.

Action A120

The wireless device 110 may receive, from the core network node 130, information about a further route for travelling to a destination given by the information about the route. The route and the further route are at least partially different from each other.

Action A140

The wireless device 110 may receive, from the core network node 130, a proposed limitation on bandwidth. The proposed limitation is to be applied during travelling of the route.

Figure 4:
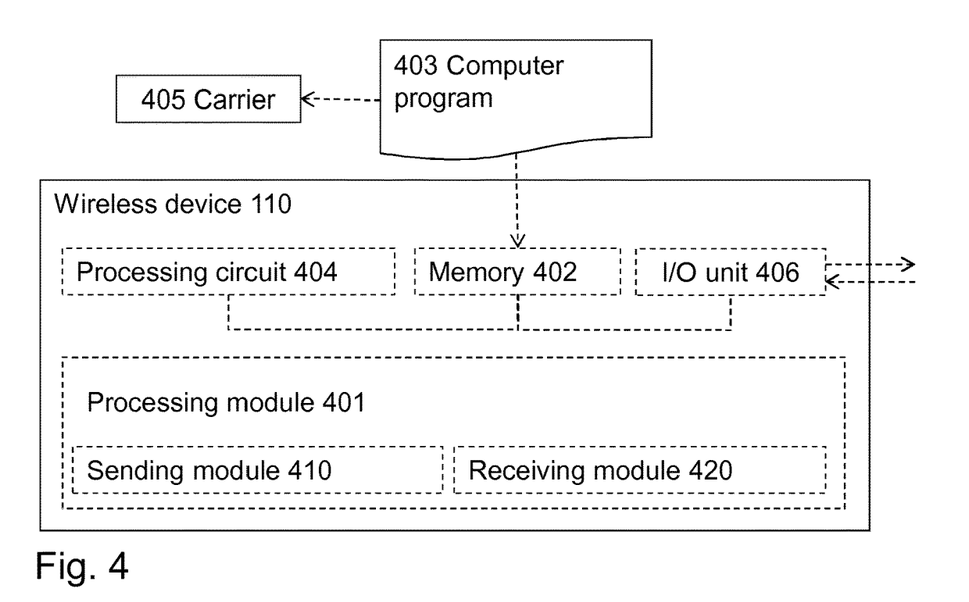
FIG. 4 is a block diagram illustrating embodiments of the wireless device.

With reference to FIG. 4, a schematic block diagram of embodiments of the wireless device 110 of FIG. 1 is shown.

The wireless device 110 may comprise a processing module 401, such as a means for performing the methods described herein. The means may be embodied in the form of one or more hardware modules and/or one or more software modules The wireless device 110 may further comprise a memory 402. The memory may comprise, such as contain or store, instructions, e.g. in the form of a computer program 403, which may comprise computer readable code units.

According to some embodiments herein, the wireless device 110 and/or the processing module 401 comprises a processing circuit 404 as an exemplifying hardware module. Accordingly, the processing module 401 may be embodied in the form of, or 'realized by', the processing circuit 404. The instructions may be executable by the processing circuit 404, whereby the wireless device 110 is operative to perform the methods of FIG. 2 and/or FIG. 3. As another example, the instructions, when executed by the wireless device 110 and/or the processing circuit 404, may cause the wireless device 110 to perform the method according to FIG. 2 and/or FIG. 3.

In view of the above, in one example, there is provided a wireless device 110 for providing an inquiry for reservation of bandwidth in a network 100. Again, the memory 402 contains the instructions executable by said processing circuit 404 whereby said wireless device 110 is operative to:

sending, to the core network node 130, the inquiry for reservation of bandwidth for the wireless device 110, wherein the inquiry comprises:
information about a route to be travelled by the wireless device 110,
a start time of when the wireless device 110 is expected to start travelling the route, and
an indication about the bandwidth to be reserved.

FIG. 4 further illustrates a carrier 405, or program carrier, which comprises the computer program 403 as described directly above.

In some embodiments, the processing module 401 comprises an Input/Output module 406, which may be exemplified by a receiving module and/or a sending module as described below when applicable.

In further embodiments, the wireless device 110 and/or the processing module 401 may comprise one or more of a sending module 410, and a receiving module 420 as exemplifying hardware modules. In other examples, one or more of the aforementioned exemplifying hardware modules may be implemented as one or more software modules.

Accordingly, the wireless device 110 is configured for providing an inquiry for reservation of bandwidth in a network 100, comprising a core network node 130 for managing inquiries for reservation of bandwidth.

Therefore, according to the various embodiments described above, the wireless device 110 and/or the processing module 401 and/or the sending module 410 is configured for sending, to the core network node 130, the inquiry for reservation of bandwidth for the wireless device 110. The inquiry comprises information about a route to be travelled by the wireless device 110, a start time of when the wireless device 110 is expected to start travelling the route, and an indication about the bandwidth to be reserved.

In some embodiments of the wireless device 110, the network 100 comprises a plurality of radio network nodes 121. The wireless device 110 and/or the processing module 401 and/or the receiving module 420 may be configured for receiving, from the core network node 130, an acknowledgment indicating that the reservation of bandwidth according to the inquiry has been accepted for a time period by at least some of the plurality of radio network nodes along the route.

The wireless device 110 and/or the processing module 401 and/or the receiving module 420 may be configured for receiving, from the core network node 130, information about a further route for travelling to a destination given by the information about the route. The route and the further route may be at least partially different from each other.

In some embodiments of the wireless device 110, the wireless device 110 and/or the processing module 401 and/or the receiving module 420 may be configured for receiving, from the core network node 130, a proposed limitation on bandwidth. The proposed limitation may be applied during travelling of the route.

Figure 5:
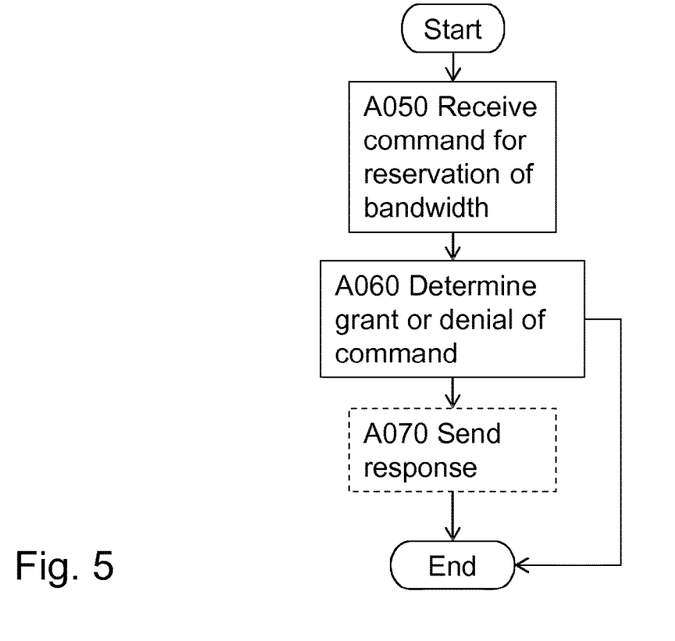
FIG. 5 is a flowchart illustrating embodiments of the method in the radio network node.

In FIG. 5, a schematic flowchart of exemplifying methods in the radio network node 120 is shown. Again, the same reference numerals as above have been used to denote the same or similar features, in particular the same reference numerals have been used to denote the same or similar actions. Accordingly, the radio network node 120 performs a method for managing a command for reservation of bandwidth in a network 100.

As mentioned, the network 100 comprises the radio network node 120 and a core network node 130 for managing inquiries for reservation of bandwidth.

One or more of the following actions may be performed in any suitable order.

Action A050

The radio network node 120 receives, from the core network node 130, the command for reservation of the bandwidth for a wireless device 110. The command comprises an indication about the bandwidth to be reserved, information relating to one or more cells of the radio network node 120, in which one or more cells bandwidth is to be reserved, a period of time indicating when the wireless device 110 is expected to make use of at least some of the bandwidth to be reserved, an identity of the wireless device 110.

Action A060

The radio network node 120 determines grant or denial of the command based on the period of time and based on available bandwidth of the radio network node 120.

The grant may further indicate a further period of time during which the reservation of the bandwidth is expected to be fulfilled.

Action A070

The radio network node 120 may send a response indicating the grant or the denial of the command.

Figure 6:
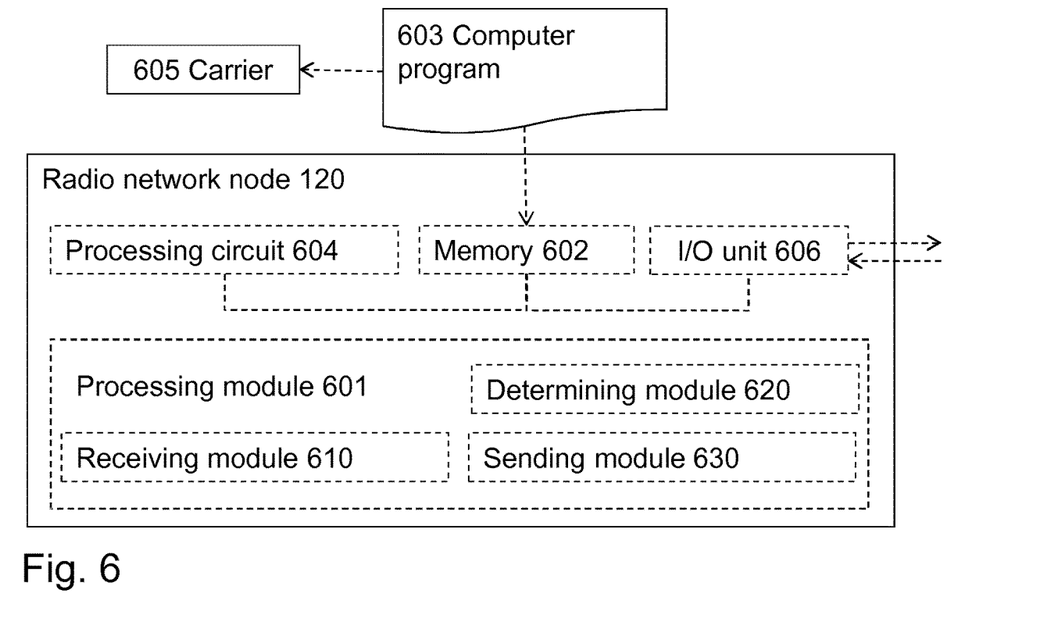
FIG. 6 is a block diagram illustrating embodiments of the radio network node.

With reference to FIG. 6, a schematic block diagram of embodiments of the radio network node 120 of FIG. 1 is shown.

The radio network node 120 may comprise a processing module 601, such as a means for performing the methods described herein. The means may be embodied in the form of one or more hardware modules and/or one or more software modules The radio network node 120 may further comprise a memory 602. The memory may comprise, such as contain or store, instructions, e.g. in the form of a computer program 603, which may comprise computer readable code units.

According to some embodiments herein, the radio network node 120 and/or the processing module 601 comprises a processing circuit 604 as an exemplifying hardware module. Accordingly, the processing module 601 may be embodied in the form of, or 'realized by', the processing circuit 604. The instructions may be executable by the processing circuit 604, whereby the radio network node 120 is operative to perform the methods of FIG. 2 and/or FIG. 5. As another example, the instructions, when executed by the radio network node 120 and/or the processing circuit 604, may cause the radio network node 120 to perform the method according to FIG. 2 and/or FIG. 5.

In view of the above, in one example, there is provided a radio network node 120 for managing a command for reservation of bandwidth in a network 100. As mentioned, the network 100 comprises the radio network node 120 and a core network node 130 for managing inquiries for reservation of bandwidth. Again, the memory 602 contains the instructions executable by said processing circuit 604 whereby said radio network node 120 is operative to:

receiving, from the core network node 130, the command for reservation of the bandwidth for a wireless device 110, wherein the command comprises:
an indication about the bandwidth to be reserved,
information relating to one or more cells of the radio network node 120, in which one or more cells bandwidth is to be reserved according to the indication about the bandwidth to be reserved,
a period of time indicating when the wireless device 110 is expected to make use of at least some of the bandwidth to be reserved, and
an identity of the wireless device 110, and determining grant or denial of the command based on the period of time and based on available bandwidth of the radio network node 120.

FIG. 6 further illustrates a carrier 605, or program carrier, which comprises the computer program 603 as described directly above.

In some embodiments, the processing module 601 comprises an Input/Output module 606, which may be exemplified by a receiving module and/or a sending module as described below when applicable.

In further embodiments, the radio network node 120 and/or the processing module 601 may comprise one or more of a receiving module 610, and a sending module 620 as exemplifying hardware modules. In other examples, one or more of the aforementioned exemplifying hardware modules may be implemented as one or more software modules.

Accordingly, the radio network node 120 is configured for managing a command for reservation of bandwidth in a network 100.

As mentioned, the network 100 comprises the radio network node 120 and a core network node 130 for managing inquiries for reservation of bandwidth.

Therefore, according to the various embodiments described above, the radio network node 120 and/or the processing module 601 and/or the receiving module 610 is configured for receiving, from the core network node 130, the command for reservation of the bandwidth for a wireless device 110. The command comprises an indication about the bandwidth to be reserved, information relating to one or more cells of the radio network node 120, in which one or more cells bandwidth is to be reserved, a period of time indicating when the wireless device 110 is expected to make use of at least some of the bandwidth to be reserved, an identity of the wireless device 110.

Furthermore, the radio network node 120 and/or the processing module 601 and/or the determining module 620 is configured for determining grant or denial of the command based on the period of time and based on available bandwidth of the radio network node 120.

In some embodiments of the radio network node 120, the grant further indicates a further period of time during which the reservation of the bandwidth is expected to be fulfilled.

Moreover, the radio network node 120 and/or the processing module 601 and/or the sending module 630 may be configured for sending the response.

Figure 7:
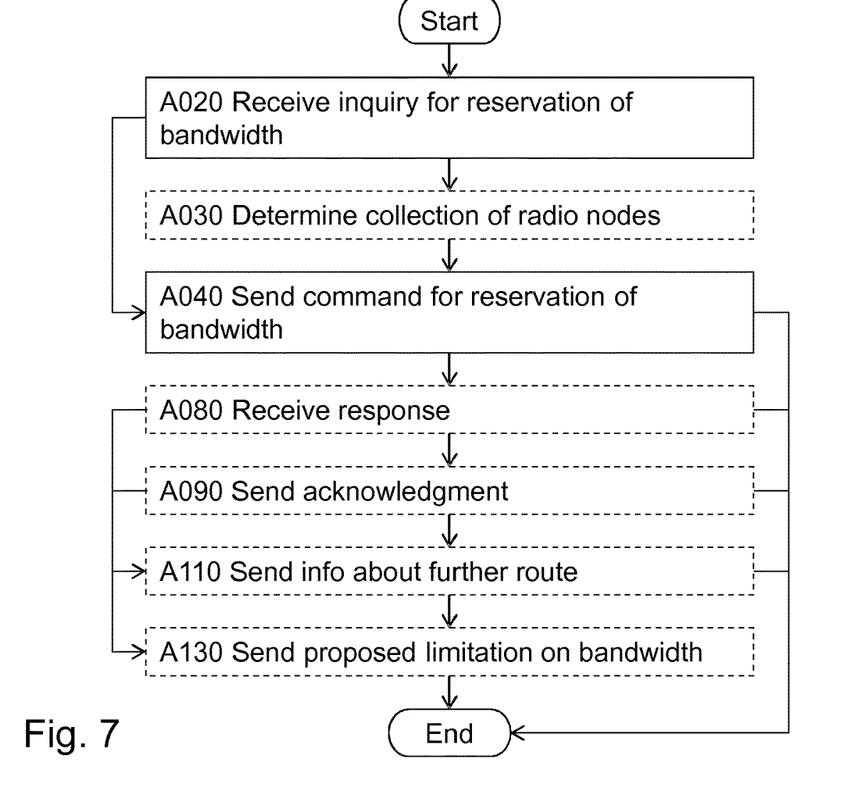
FIG. 7 is a flowchart illustrating embodiments of the method in the core network node.

In FIG. 7, a schematic flowchart of exemplifying methods in the core network node 130 is shown. Again, the same reference numerals as above have been used to denote the same or similar features, in particular the same reference numerals have been used to denote the same or similar actions. Accordingly, the core network node 130 performs a method for managing an inquiry for reservation of bandwidth in a network 100, comprising a plurality of radio network nodes 121.

As mentioned, the network 100 may comprise a plurality of radio network nodes.

One or more of the following actions may be performed in any suitable order.

Action A020

The core network node 130 receives, from a wireless device 110, the inquiry for reservation of the bandwidth for the wireless device 110. The inquiry comprises information about a route to be travelled by the wireless device 110, a start time of when the wireless device 110 is expected to start travelling the route, and an indication about the bandwidth to be reserved.

Action A040

The core network node 130 sends, to each radio network node 120 along the route, a command for reservation of the bandwidth to be reserved for the wireless device 110. The command comprises an indication about the bandwidth to be reserved, information relating to one or more cells of the radio network node 120, in which one or more cells bandwidth is to be reserved, a parameter indicating a period of time during which the wireless device 110 is expected to make use of at least some of the bandwidth to be reserved, and an identity of the wireless device 110.

Action A080

The core network node 130 may receive the response. In this manner, the core network node 130 is made aware of an outcome of action A040, i.e. the sending of the command.

Action A090

The core network node 130 may send, to the wireless device 110, an acknowledgment indicating that the reservation of the bandwidth according to the inquiry has been accepted for a time period by at least some of the plurality of radio network nodes along the route.

Action A110

The core network node 130 may send, to the wireless device 110, information about a further route for travelling to a destination given by the route. The route and the further route are at least partially different from each other.

Action A130

The core network node 130 may send, to the wireless device 110, a proposed limitation on bandwidth. The proposed limitation is to be applied during travelling of the route.

Action A030

The core network node 130 may determine a collection of radio network nodes 121 from among the plurality of radio network nodes 121, 122 based on the information about the route. The wireless device 110 is expected to be served by the collection of radio network nodes 121 when travelling along the route.

Figure 8:
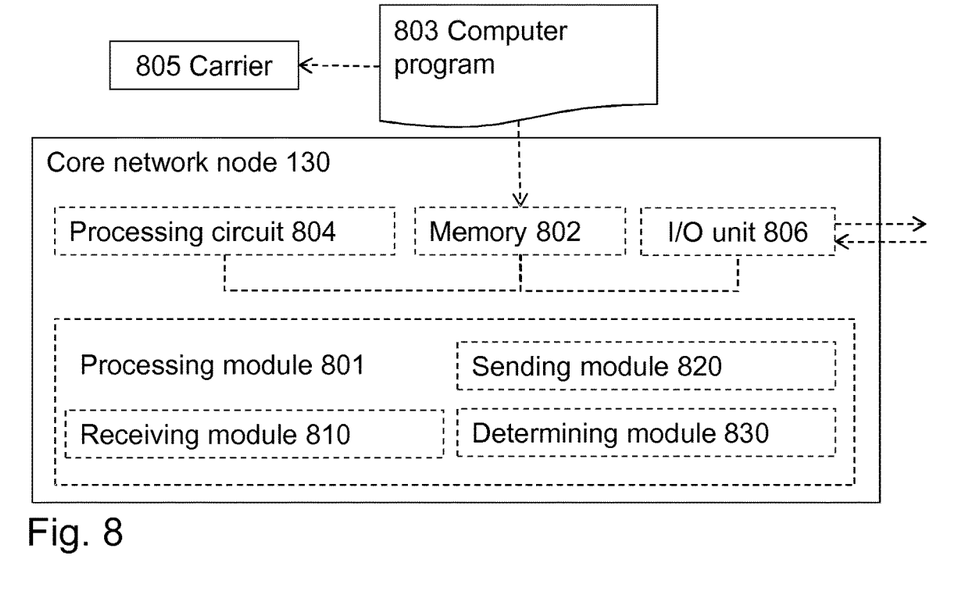
FIG. 8 is a block diagram illustrating embodiments of the core network node.

With reference to FIG. 8, a schematic block diagram of embodiments of the core network node 130 of FIG. 1 is shown.

The core network node 130 may comprise a processing module 801, such as a means for performing the methods described herein. The means may be embodied in the form of one or more hardware modules and/or one or more software modules The core network node 130 may further comprise a memory 802. The memory may comprise, such as contain or store, instructions, e.g. in the form of a computer program 803, which may comprise computer readable code units.

According to some embodiments herein, the core network node 130 and/or the processing module 801 comprises a processing circuit 804 as an exemplifying hardware module. Accordingly, the processing module 801 may be embodied in the form of, or 'realized by', the processing circuit 804. The instructions may be executable by the processing circuit 804, whereby the core network node 130 is operative to perform the methods of FIG. 2 and/or FIG. 7. As another example, the instructions, when executed by the core network node 130 and/or the processing circuit 804, may cause the core network node 130 to perform the method according to FIG. 2 and/or FIG. 7.

In view of the above, in one example, there is provided a core network node 130 for managing an inquiry for reservation of bandwidth in a network 100. As mentioned, the network 100 may comprise a plurality of radio network nodes 121, 122. Again, the memory 802 contains the instructions executable by said processing circuit 804 whereby said core network node 130 is operative to:

receiving, from a wireless device 110, the inquiry for reservation of the bandwidth for the wireless device 110, wherein the inquiry comprises:
  information about a route to be travelled by the wireless device 110,
  a start time of when the wireless device 110 is expected to start travelling the route, and
  an indication about the bandwidth to be reserved, and
sending, to each radio network node 120 along the route, a command for reservation of the bandwidth to be reserved for the wireless device 110, wherein the command comprises:
  the indication about the bandwidth to be reserved,
  information relating to one or more cells of the radio network node 120, in which one or more cells bandwidth is to be reserved according to the indication about the bandwidth to be reserved,
  a parameter indicating a period of time during which the wireless device 110 is expected to make use of at least some of the bandwidth to be reserved, and
  an identity of the wireless device 110.

FIG. 8 further illustrates a carrier 805, or program carrier, which comprises the computer program 803 as described directly above.

In some embodiments, the processing module 801 comprises an Input/Output module 806, which may be exemplified by a receiving module and/or a sending module as described below when applicable.

In further embodiments, the core network node 130 and/or the processing module 801 may comprise one or more of a receiving module 810, a sending module 820, and a determining module 830 as exemplifying hardware modules. In other examples, one or more of the aforementioned exemplifying hardware modules may be implemented as one or more software modules.

Accordingly, the core network node 130 is configured for managing an inquiry for reservation of bandwidth in a network 100. As mentioned, the network 100 may comprise a plurality of radio network nodes 121, 122.

Therefore, according to the various embodiments described above, the core network node 130 and/or the processing module 801 and/or the receiving module 810 is configured for receiving, from a wireless device 110, the inquiry for reservation of the bandwidth for the wireless device 110. The inquiry comprises information about a route to be travelled by the wireless device 110, a start time of when the wireless device 110 is expected to start travelling the route, and an indication about the bandwidth to be reserved.

Furthermore, the core network node 130 and/or the processing module 801 and/or the sending module 820 is configured for sending, to each radio network node 120 along the route, a command for reservation of the bandwidth to be reserved for the wireless device 110. The command comprises the indication about the bandwidth to be reserved, information relating to one or more cells of the radio network node 120, in which one or more cells bandwidth is to be reserved, a parameter indicating a period of time during which the wireless device 110 is expected to make use of at least some of the bandwidth to be reserved, and an identity of the wireless device 110.

In some embodiments of the core network node 130, the core network node 130 and/or the processing module 801 and/or the sending module 820 may be configured for sending, to the wireless device 110, an acknowledgment indicating that the reservation of the bandwidth according to the inquiry has been accepted for a time period by at least some of the plurality of radio network nodes along the route.

The core network node 130 and/or the processing module 801 and/or the sending module 820 may be configured for sending, to the wireless device 110, information about a further route for travelling to a destination given by the route. The route and the further route may be at least partially different from each other.

In some embodiments of the core network node 130, the core network node 130 and/or the processing module 801 and/or the sending module 820 may be configured for sending, to the wireless device 110, a proposed limitation on bandwidth. The proposed limitation is to be applied during travelling of the route.

In some embodiments of the core network node 130, the core network node 130 and/or the processing module 801 and/or the determining module 830 may be configured for determining a collection of radio network nodes 121 from among the plurality of radio network nodes 121, 122 based on the information about the route. The wireless device 110 is expected to be served by the collection of radio network nodes 121 when travelling along the route.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est." may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a core network node, for managing an inquiry for reservation of bandwidth in a network, comprising a plurality of radio network nodes, wherein the method comprises:
   receiving, from a wireless device, the inquiry for reservation of the bandwidth for the wireless device, wherein the inquiry comprises:
      information about a route to be travelled by the wireless device,
      a start time of when the wireless device is expected to start travelling the route, and
      an indication about the bandwidth to be reserved, and
   sending to each radio network node along the route, in response to the inquiry, a command for reservation of the bandwidth to be reserved for the wireless device, wherein the command comprises:
      the indication about the bandwidth to be reserved,
      information relating to one or more cells of the radio network node, in which one or more cells bandwidth is to be reserved according to the indication about the bandwidth to be reserved,
      a parameter indicating a period of time during which the wireless device is expected to make use of at least some of the bandwidth to be reserved, and
      an identity of the wireless device.

2. The method of claim 1, wherein the method comprises: sending, to the wireless device, an acknowledgment indicating that the reservation of the bandwidth according to the inquiry has been accepted for a time period by at least some of the plurality of radio network nodes along the route.

3. The method of claim 1, wherein the method comprises: sending, to the wireless device, information about a further route for travelling to a destination given by the information about the route, wherein the route and the further route are at least partially different from each other.

4. The method of claim 1, wherein the method comprises: sending, to the wireless device, a proposed limitation on bandwidth, wherein the proposed limitation is to be applied during travelling of the route.

5. The method of claim 1, wherein the method comprises: determining a collection of radio network nodes from among the plurality of radio network nodes based on the information about the route, wherein the wireless device is expected to be served by the collection of radio network nodes when travelling along the route.

6. A non-transitory computer-readable medium comprising, stored thereupon, a computer program comprising computer readable code units that when executed on a core network node cause the core network node to perform the method of claim 1.

7. A wireless device configured to provide an inquiry for reservation of bandwidth in a network, comprising a core network node for managing inquiries for reservation of bandwidth, wherein the wireless device comprises:
   a processing circuit and a memory operatively coupled to the processing circuit, wherein the processing circuit and memory are configured to send, to the core network node, the inquiry for reservation of bandwidth for the wireless device, wherein the inquiry comprises:
      information about a route to be travelled by the wireless device,
      a start time of when the wireless device is expected to start travelling the route, and
      an indication about the bandwidth to be reserved.

8. The wireless device of claim 7, wherein the network comprises a plurality of radio network nodes, wherein the processing circuit and memory are configured to receive, from the core network node, an acknowledgment indicating that the reservation of bandwidth according to the inquiry has been accepted for a time period by at least some radio network nodes along the route.

9. The wireless device of claim 7, wherein the processing circuit and memory are further configured to receive, from the core network node, information about a further route for travelling to a destination given by the information about the route, wherein the route and the further route are at least partially different from each other.

10. The wireless device of claim 7, wherein the processing circuit and memory are configured to receive, from the core network node, a proposed limitation on bandwidth, wherein the proposed limitation is to be applied during travelling of the route.

11. A radio network node configured for managing a command for reservation of bandwidth in a network, wherein the network comprises the radio network node and a core network node for managing inquiries for reservation of bandwidth, wherein the radio network node comprises:
   a processing circuit and memory operatively coupled to the processing circuit, wherein the processing circuit and memory are configured to:
      receive, from the core network node, a command for reservation of bandwidth for a wireless device, wherein the command comprises:
         an indication about the bandwidth to be reserved,
         information relating to one or more cells of the radio network node, in which one or more cells bandwidth is to be reserved according to the indication about the bandwidth to be reserved,
         a parameter indicating a period of time during which the wireless device is expected to make use of at least some of the bandwidth to be reserved, and
         an identity of the wireless device; and
      determine grant or denial of the command based on the period of time and based on available bandwidth of the radio network node.

12. The radio network node of claim 11, wherein the grant further indicates a further period of time during which the reservation of the bandwidth is expected to be fulfilled.

13. A core network node configured for managing an inquiry for reservation of bandwidth in a network, comprising a plurality of radio network nodes and the core network node, wherein the core network node comprises:
   a processing circuit and memory operatively coupled to the processing circuit, wherein the processing circuit and memory are configured to:
      receive at the core network node, from a wireless device, the inquiry for reservation of the bandwidth for the wireless device, wherein the inquiry comprises information about a route to be travelled by the wireless device, a start time of when the wireless device is expected to start travelling the route, and an indication about the bandwidth to be reserved; and send, to each radio network node along the route, a command for reservation of the bandwidth to be reserved for the wireless device, wherein the command comprises the indication about the bandwidth to be reserved, information relating to one or more cells of the radio network node, in which one or more cells bandwidth is to be reserved according to the indication about the bandwidth to be reserved, a parameter indicating a period of time during which the wireless device is expected to make use of at least some of the bandwidth to be reserved, and an identity of the wireless device.

14. The core network node of claim 13, wherein the processing circuit and memory are configured to send, to the wireless device, an acknowledgment indicating that the reservation of the bandwidth according to the inquiry has been accepted for a time period by at least some of the plurality of radio network nodes along the route.

15. The core network node of claim 13, wherein the processing circuit and memory are configured to send, to the wireless device, information about a further route for travelling to a destination given by the route, wherein the route and the further route are at least partially different from each other.

16. The core network node of claim 13, wherein the processing circuit and memory are configured to send, to the wireless device, a proposed limitation on bandwidth, wherein the proposed limitation is to be applied during travelling of the route.

17. The core network node of claim 13, wherein the processing circuit and memory are configured to determine a collection of radio network nodes from among the plurality of radio network nodes based on the information about the route, wherein the wireless device is expected to be served by the collection of radio network nodes when travelling along the route.

* * * * *